US010511479B2

United States Patent
Xie et al.

(10) Patent No.: US 10,511,479 B2
(45) Date of Patent: Dec. 17, 2019

(54) SERVICE DEPLOYMENT METHOD AND NETWORK FUNCTIONS ACCELERATION PLATFORM

(71) Applicant: Huawei Technologies Co., Ltd., Shenzhen (CN)

(72) Inventors: Yuming Xie, Shenzhen (CN); Liang Zhang, Shenzhen (CN); Jun Wu, Shenzhen (CN); Fan Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 15/403,798

(22) Filed: Jan. 11, 2017

(65) Prior Publication Data
US 2017/0126487 A1 May 4, 2017

Related U.S. Application Data

(63) Continuation of application No. PCT/CN2015/077383, filed on Apr. 24, 2015.

(30) Foreign Application Priority Data

Jul. 11, 2014 (CN) .......................... 2014 1 0331856

(51) Int. Cl.
*H04L 12/24* (2006.01)
*G06F 9/455* (2018.01)
(Continued)

(52) U.S. Cl.
CPC ........ *H04L 41/082* (2013.01); *G06F 9/45558* (2013.01); *H04L 41/083* (2013.01);
(Continued)

(58) Field of Classification Search
None
See application file for complete search history.

(56) References Cited

U.S. PATENT DOCUMENTS

2008/0148341 A1 6/2008 Ferguson et al.
2010/0283505 A1* 11/2010 Koch .................. G06F 15/7867
326/41
(Continued)

FOREIGN PATENT DOCUMENTS

CN 101645832 A 2/2010
CN 103141058 A 6/2013
(Continued)

OTHER PUBLICATIONS

Dong Yin et al. Customizing Virtual Networks with Partial FPGA Reconfiguration, VISA 2010, Sep. 3, 2010. pp. 57-64. XP058254381.
(Continued)

*Primary Examiner* — Angela Nguyen
(74) *Attorney, Agent, or Firm* — Leydig, Voit & Mayer, Ltd.

(57) ABSTRACT

A service deployment method and a network functions acceleration platform are provided. The method includes: when an FPGA is powered on, loading, by the FPGA, an FPGA framework file, so that the FPGA includes M partial reconfigurable PR areas, a configuration module, and a data flow forwarding module; when receiving a service configuration instruction, generating, by a physical machine, a VM, and selecting at least one PR area from the M PR areas to establish a correspondence with the VM; performing, by a configuration module, service resource configuration on the selected PR area according to a PR configuration resource, so that the selected PR area has a service processing capability; adding, by the configuration module, a forwarding entry corresponding to the PR area in a forwarding flow table, so that the data flow forwarding module forwards a received network packet to the corresponding PR area.

10 Claims, 7 Drawing Sheets

(51) Int. Cl.
*H04L 12/741* (2013.01)
*H04L 29/12* (2006.01)

(52) U.S. Cl.
CPC .......... *H04L 45/54* (2013.01); *H04L 61/2007* (2013.01); *G06F 2009/45562* (2013.01); *H04L 41/0843* (2013.01); *H04L 41/0896* (2013.01)

(56) References Cited

U.S. PATENT DOCUMENTS

| | | |
|---|---|---|
| 2012/0079478 A1 | 3/2012 | Galles et al. |
| 2013/0034094 A1 | 2/2013 | Cardona et al. |
| 2014/0108665 A1 | 4/2014 | Arora et al. |
| 2014/0282506 A1* | 9/2014 | Cadigan, Jr. ............ G06F 9/54 718/1 |
| 2015/0312144 A1* | 10/2015 | Gobriel ............ H04L 45/7453 709/242 |
| 2015/0334295 A1* | 11/2015 | Hinkel ............ H04N 5/23209 348/222.1 |
| 2015/0350077 A1* | 12/2015 | Durrani ............... H04L 45/745 709/225 |
| 2015/0372917 A1 | 12/2015 | Biswas et al. |
| 2016/0014024 A1* | 1/2016 | You .................. H04L 45/54 370/389 |
| 2016/0036998 A1* | 2/2016 | Goda ............... H04N 1/00509 358/1.13 |

FOREIGN PATENT DOCUMENTS

| | | |
|---|---|---|
| CN | 103595648 A | 2/2014 |
| WO | 2012039792 A1 | 3/2012 |

OTHER PUBLICATIONS

Deepak Unnikrishnan et al. Scalable Network Virtualization Using FPGAs, FPGA'10, Feb. 21-23, 2010. pp. 219-228. XP058093192.
Huawei Technologies (UK):"FPGA for Hardware Acceleration",;ETSI DRAFT; May 7, 2014. pp. 1-4, XP014227562.
European Patent Application No. 15 819 218.7, Search Report (dated Oct. 29, 2018).

* cited by examiner

SERVICE DEPLOYMENT METHOD AND NETWORK FUNCTIONS ACCELERATION PLATFORM

CROSS-REFERENCE TO RELATED APPLICATIONS

This application is a continuation of International Application No. PCT/CN2015/077383, filed on Apr. 24, 2015 which claims priority to Chinese Patent Application No. 201410331856.7, filed on Jul. 11, 2014. The disclosures of the aforementioned applications are hereby incorporated by reference in their entireties.

TECHNICAL FIELD

Embodiments of the present invention relate to the field of communications technologies, and in particular, to a service deployment method and a network functions acceleration platform.

BACKGROUND

Network functions virtualization (NFV) is proposed by an operator alliance, a virtual device may be quickly added and controlled on a network hardware platform based on requirements by using a standard information technology (IT) virtualization technology, and then a virtual network function (VNF) service is deployed by using the virtual device. Currently, in a multi-core X86 system, a general-purpose multi-core X86 system is coupled with a field-programmable gate array (FPGA) module in a peripheral chip by using a bus supporting a single-root input/output virtualization specification (SR-IOV) and an interface standard (PCIE) bus, a virtual machine (VM) is generated in a CPU of the X86 system by using a hypervisor, and a VNF function is implemented by using the VM.

Generally, service processing is performed by the VM. When the VM performs the service processing, a physical machine CPU needs to be accessed frequently. Therefore, overhead of CPU software is relatively large, and overall communication performance is not high.

SUMMARY

Based on the foregoing introduction, embodiments of the present invention provide a service deployment method and a network functions acceleration platform, for improving processing speed and performance of a system.

A first aspect of the present invention provides a service deployment method, where the service deployment method is applied to a network functions acceleration platform NFAP, where the NFAP includes a physical machine and an acceleration card, the physical machine and the acceleration card are connected by using a PCIe data channel, the acceleration card includes a field-programmable gate array FPGA, and the method includes:

loading, by the FPGA, an FPGA framework file when the FPGA is powered on, so that the FPGA includes M partial reconfigurable PR areas, a configuration module, and a data flow forwarding module, where a hardware resource in the FPGA is allocated to the PR areas, the configuration module is connected to the PCIe data channel and is connected to the PR areas, the data flow forwarding module is connected to the PR areas, the data flow forwarding module includes an empty forwarding flow table, and M is a positive integer greater than or equal to 1;

when receiving a service configuration instruction, generating, by the physical machine, a virtual machine VM, and selecting at least one PR area from the M PR areas to establish a correspondence with the VM;

performing, by the configuration module, service resource configuration on the selected PR area according to a PR configuration resource, so that the selected PR area has a service processing capability, where the PR configuration resource is generated by the VM according to the service configuration instruction and a configuration template; and adding, by the configuration module, a forwarding entry corresponding to the PR area in the forwarding flow table, so that the data flow forwarding module forwards a received network packet to the corresponding PR area by searching the forwarding flow table, where the forwarding entry is generated by the physical machine according to a to-be-processed network packet and a forwarding template.

With reference to the first aspect, in a first possible implementation manner, the generating, by the VM, the PR configuration resource according to the service configuration instruction and a configuration template includes: applying, by the VM, to the physical machine for a memory resource and generating a PR configuration file according to the memory resource, where the configuration file includes a buffer address and a buffer size; and obtaining, by the VM, a PR execution file corresponding to a service capability from a database according to the configuration template and the service capability indicated by the service configuration instruction, where the PR execution file and the PR configuration file constitute the PR configuration resource.

With reference to the first aspect or the first possible implementation manner of the first aspect, in a second possible implementation manner, the forwarding, by the data flow forwarding module, a received network packet to the corresponding PR area by searching the forwarding flow table includes: receiving, by the data flow forwarding module, a to-be-processed network packet, and obtaining a forwarding parameter from the to-be-processed network packet, where the forwarding parameter includes a quintuple, and the quintuple includes a destination internet protocol IP address, a source IP address, a destination port, a source port, and a transport layer protocol number; searching, by the data flow forwarding module, for a forwarding entry corresponding to the forwarding parameter in the forwarding flow table; when finding the forwarding entry corresponding to the forwarding parameter in the forwarding flow table, searching, by the data flow forwarding module, for a PR area in the found forwarding entry; and sending, by the data flow forwarding module, the to-be-processed network packet to the found PR area.

With reference to the second possible implementation manner of the first aspect, in a third possible implementation manner, the method further includes: when not finding the forwarding entry corresponding to the forwarding parameter in the forwarding flow table, sending, by the data flow forwarding module, the to-be-processed network packet to the physical machine.

With reference to the third possible implementation manner of the first aspect, in a fourth possible implementation manner, after the sending, by the data flow forwarding module, the to-be-processed network packet to the physical machine, the method includes:

receiving, by the physical machine, the to-be-processed network packet, and searching a service rule table, where the service rule table is used for indicating processing capability of a PR area;

obtaining, by the physical machine, a forwarding parameter required by the forwarding template from the to-be-processed network packet if the PR area for processing the to-be-processed network packet is found in the service rule table;

generating, by the physical machine, a forwarding entry according to the forwarding template, where the forwarding entry includes a quintuple and the PR area for processing the to-be-processed network packet; and delivering, by the physical machine, the forwarding entry to the configuration module, so that the configuration module adds the forwarding entry in the forwarding flow table of the data flow forwarding module.

A second aspect of the present invention provides a network functions acceleration platform, where the network functions acceleration platform includes a physical machine and an acceleration card, the physical machine and the acceleration card are connected by using a PCIe data channel, and the acceleration card includes a field-programmable gate array FPGA;

the FPGA is configured to load an FPGA framework file when the FPGA is powered on, so that the FPGA includes M partial reconfigurable PR areas, a configuration module, and a data flow forwarding module, where a hardware resource in the FPGA is allocated to the PR areas, the configuration module is connected to the PCIe data channel and is connected to the PR areas, the data flow forwarding module is connected to the PR areas, the data flow forwarding module includes an empty forwarding flow table, and M is a positive integer greater than or equal to 1;

the physical machine is configured to: when receiving a service configuration instruction, generate a virtual machine VM and select at least one PR area from the M PR areas to establish a correspondence with the VM;

the configuration module is configured to perform service resource configuration on the selected PR area according to a PR configuration resource, so that the selected PR area has a service processing capability, where the PR configuration resource is generated by the VM according to the service configuration instruction and a configuration template;

the configuration module is further configured to add a forwarding entry corresponding to the PR area in the forwarding flow table; and the data flow forwarding module is configured to forward a received network packet to the corresponding PR area by searching the forwarding flow table, where the forwarding entry is generated by the physical machine according to a to-be-processed network packet and a forwarding template.

With reference to the second aspect, in a first possible implementation manner, the VM is configured to apply to the physical machine for a memory resource and generate a PR configuration file according to the memory resource, where the configuration file includes a buffer address and a buffer size; and obtain a PR execution file corresponding to a service capability from a database according to the configuration template and the service capability indicated by the service configuration instruction, where the PR execution file and the PR configuration file constitute the PR configuration resource.

With reference to the second aspect or the first possible implementation manner of the second aspect, in a second possible implementation manner, the data flow forwarding module is specifically configured to receive the to-be-processed network packet, and obtain a forwarding parameter from the to-be-processed network packet, where the forwarding parameter includes a quintuple, and the quintuple includes a destination internet protocol IP address, a source IP address, a destination port, a source port, and a transport layer protocol number; search for a forwarding entry corresponding to the forwarding parameter in the forwarding flow table; when finding the forwarding entry corresponding to the forwarding parameter in the forwarding flow table, search for a PR area in the found forwarding entry; and send the to-be-processed network packet to the found PR area.

With reference to the second possible implementation manner of the second aspect, in a third possible implementation manner, the data flow forwarding module is further configured to: when not finding the forwarding entry corresponding to the forwarding parameter in the forwarding flow table, send the to-be-processed network packet to the physical machine.

With reference to the third possible implementation manner of the second aspect, in a fourth possible implementation manner, the physical machine is further configured to receive the to-be-processed network packet, and search a service rule table, where the service rule table is configured to indicate processing capability of a PR area; if the PR area for processing the to-be-processed network packet is found in the service rule table, obtain a forwarding parameter required by the forwarding template from the to-be-processed network packet; generate a forwarding entry according to the forwarding template, where the forwarding entry includes a quintuple and the PR area for processing the to-be-processed network packet; and deliver the forwarding entry to the configuration module, so that the configuration module adds the forwarding entry in the forwarding flow table of the data flow forwarding module.

It can be seen from the foregoing technical solutions that, the service deployment method and the network functions acceleration platform provided by the embodiments of the present invention have the following advantages:

When an FPGA is powered on, the FPGA loads an FPGA framework file, so that the FPGA includes M partial reconfigurable PR areas, a configuration module, and a data flow forwarding module, where a hardware resource in the FPGA is allocated to the PR areas, the configuration module is connected to a PCIe data channel and is separately connected to the PR areas, and the data flow forwarding module is connected to the PR areas. When receiving a service configuration instruction, a physical machine generates a VM according to the service configuration instruction, a correspondence is established between the VM and at least one PR area, the configuration module performs service resource configuration on the selected PR area according to a PR configuration resource, and the configuration module further adds a forwarding entry corresponding to the PR area in a forwarding flow table, so that the data flow forwarding module forwards a received network packet to the corresponding PR area by searching the forwarding flow table. Compared with the prior art, in the embodiments of the present invention, the FPGA loads the FPGA framework file, so that the FPGA obtains the M partial reconfigurable PR areas, the configuration module, and the data flow forwarding module, and then the PR areas and the data flow forwarding module are configured by using the configuration module, so that the PR areas have a service processing capability, thereby reducing VM processing and improving processing efficiency and processing speed of an entire system.

BRIEF DESCRIPTION OF DRAWINGS

To illustrate the technical solutions in the embodiments of the present invention more clearly, the following briefly introduces accompanying drawings required for describing the embodiments. Apparently, the accompanying drawings in the following description merely show some embodiments of the present invention, and a person of ordinary skill in the art may still derive other drawings according to these accompanying drawings without creative efforts.

DESCRIPTION OF EMBODIMENTS

Figure 1A:
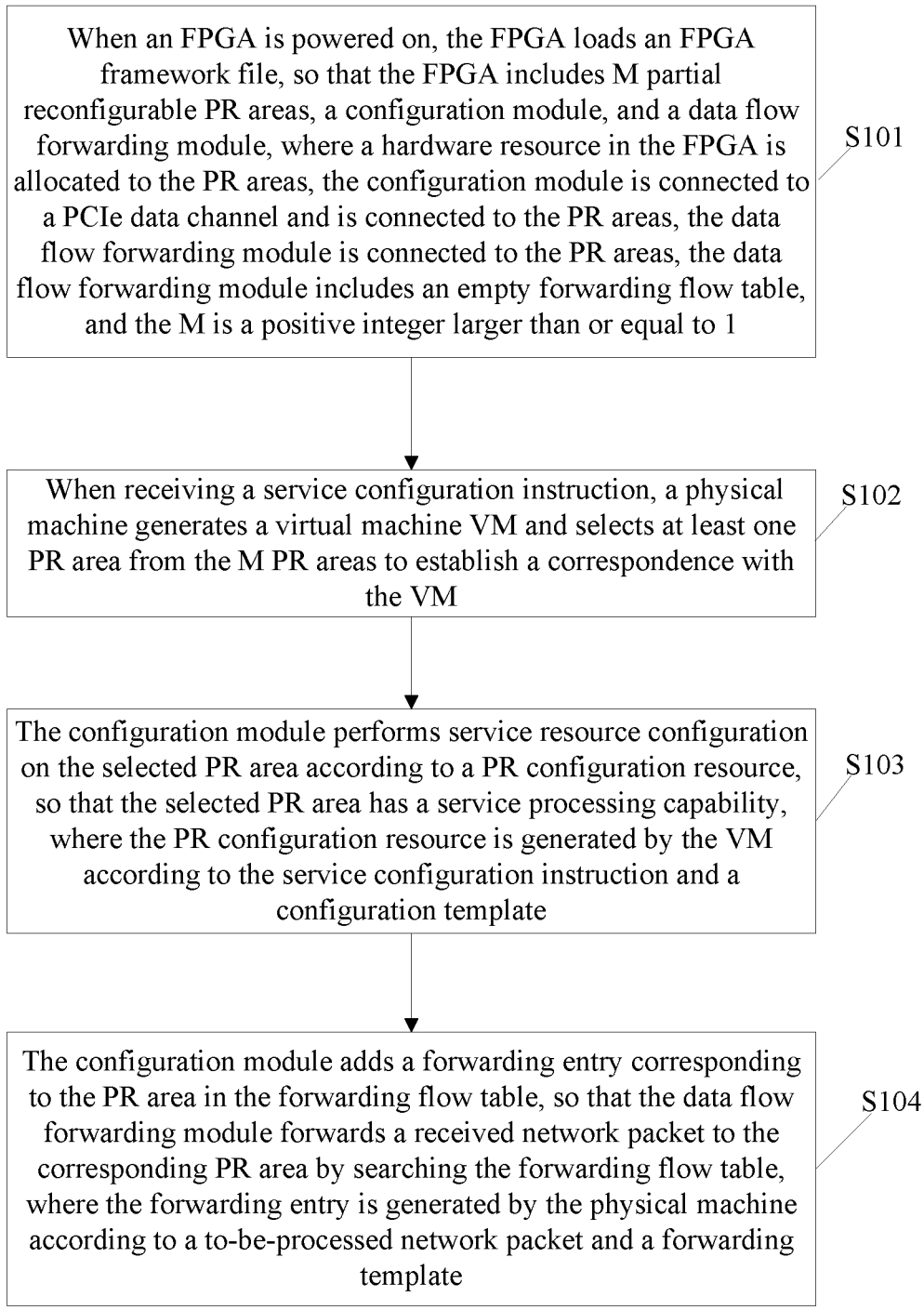
FIG. 1a is a schematic flowchart of a service deployment method according to an embodiment of the present invention.

Embodiments of the present invention provide a service deployment method and a network functions acceleration platform, which may be used for improving service processing speed and enhancing processing efficiency of an entire system.

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Terms "first", "second", "third", "fourth", and the like (if existing) in the specification and claims of the present invention and the foregoing accompany drawings are used for distinguishing similar objects, but are not necessarily used for describing a particular order or a precedence order. It should be understood that data used in such a manner may be exchanged under appropriate circumstances, so that the embodiments of the present invention described herein can be implemented, for example, in other sequences besides these sequences as shown in the drawings or described herein. In addition, terms "including", "having", and any other variant thereof, are intended to cover a non-exclusive inclusion. For example, processes, methods, systems, products, or devices that include a series of steps or units are not necessarily limited to these clearly listed steps or units, but may include other steps or units, which are not clearly listed or inherent to these processes, methods, systems, products, or devices.

A network functions acceleration platform (NFAP) provided by an embodiment of the present invention mainly includes a physical machine and an acceleration card. The physical machine may be a multi-core X86 CPU, the acceleration card includes an FPGA, and the acceleration card and the physical machine are connected by using a PCIe data channel.

Referring to FIG. 1a, FIG. 1a is a schematic flowchart of a service deployment method according to an embodiment of the present invention. As shown in FIG. 1a, the service deployment method may include:

S101. When an FPGA is powered on, the FPGA loads an FPGA framework file, so that the FPGA includes M partial reconfigurable PR areas, a configuration module, and a data flow forwarding module, where a hardware resource in the FPGA is allocated to the PR areas, the configuration module is connected to a PCIe data channel and is connected to the PR areas, the data flow forwarding module is connected to the PR areas, the data flow forwarding module includes an empty forwarding flow table, and M is a positive integer greater than or equal to 1.

Figure 1B:
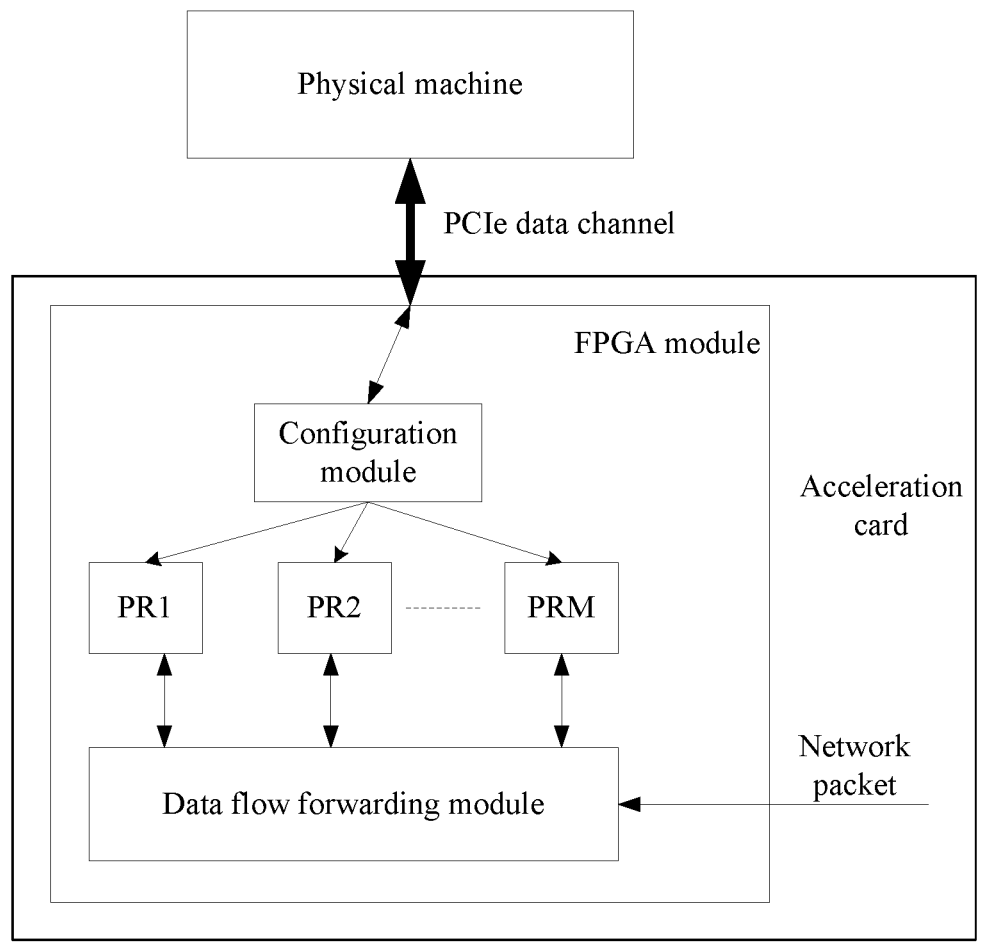
FIG. 1b is a schematic diagram of an application of a service deployment method according to an embodiment of the present invention.

It may be understood that, when the FPGA is powered on for use, the FPGA first downloads the FPGA framework file from an acceleration card flash memory in which the FPGA is located, and then the FPGA loads the FPGA framework file, so that the FPGA includes the M partial reconfigurable (PR) areas, the configuration module, and the data flow forwarding module. The configuration module is connected to the PCIe data channel, the data flow forwarding module and the PR areas are connected to obtain an NFAP, and the NFAP is shown in FIG. 1b.

The hardware resource in the FPGA, for example, a register, a memory or a look up table (LUT) in the FPGA, is allocated to the PR areas, and certainly, an external storage or the like used by the FPGA may also be allocated to the PR areas.

It should be noted that, a same hardware resource is not allocated to two different PR areas for use, that is, different PR areas use their own hardware resources.

S102. When receiving a service configuration instruction, a physical machine generates a virtual machine VM and selects at least one PR area from the M PR areas to establish a correspondence with the VM.

When the VM needs to be added, an external VNF manager sends the service configuration instruction to the physical machine, after receiving the service configuration instruction, the physical machine generates one VM in the physical machine, and the correspondence is established between the generated VM and at least one of the M PR areas, so that a service processed by the VM may be processed by the PR area having the correspondence. Certainly, the VM has a control capability on the PR area with which the correspondence is established and may provide some control policies.

Preferably, the service configuration instruction includes a memory size, a hard disk size, a service capability, or the like of the to-be-generated VM. The service capability refers to a service processing capability of the PR area corresponding to the generated VM.

The memory size and the hard disk size of the generated VM satisfy the memory size and the hard disk size indicated in the service configuration instruction. A PR service configuration resource includes a PR configuration file required for configuring the PR area and a PR execution file required for performing service processing by the PR area, where the configuration file mainly includes a buffer address, a buffer size, and the like that may be used by the PR area, the PR execution file may be a program capable of implementing packet classification, state flow-based analysis, deep packet inspection (DPI), flow-based load balancing, and security processing and other processing, and contents in the configuration file are some memory resources that may be used when the execution file is executed.

It may be understood that, the physical machine further includes a hypervisor of the VM, and the VM is generated by the hypervisor. The correspondence is established between the VM and at least one of the M PR areas, so that the service processed by the VM may be processed by the PR area having the correspondence. If necessary, the VM may provide some control policies for the PR area having the correspondence.

S103. The configuration module performs service resource configuration on the selected PR area according to a PR configuration resource, so that the selected PR area has a service processing capability, where the PR configuration resource is generated by the VM according to the service configuration instruction and a configuration template.

The VM first sends the PR configuration resource to the configuration module, and then the configuration module performs the service resource configuration on the PR area according to the PR configuration resource.

S104. The configuration module adds a forwarding entry corresponding to the PR area in the forwarding flow table, so that the data flow forwarding module forwards a received network packet to the corresponding PR area by searching the forwarding flow table, where the forwarding entry is generated by the physical machine according to a to-be-processed network packet and a forwarding template.

It should be noted that, the data flow forwarding module includes the empty forwarding flow table, and the forwarding flow table is subsequently configured by adding the forwarding entry corresponding to the PR area in the forwarding flow table.

In this embodiment of the present invention, when an FPGA is powered on, the FPGA loads an FPGA framework file, so that the FPGA includes M partial reconfigurable PR areas, a configuration module, and a data flow forwarding module, where the data flow forwarding module includes an empty forwarding flow table. When a physical machine receives a service configuration instruction, the configuration module performs service resource configuration on a PR area, so that the PR area has a service processing capability. A forwarding entry corresponding to the PR area is added in the forwarding flow table, and a to-be-processed network packet may be forwarded to the corresponding PR area by searching the forwarding flow table, so that some services processed by the VM may be processed by the PR area, thereby reducing CPU consumption of the physical machine and improving system performance and service processing speed.

Figure 2A:
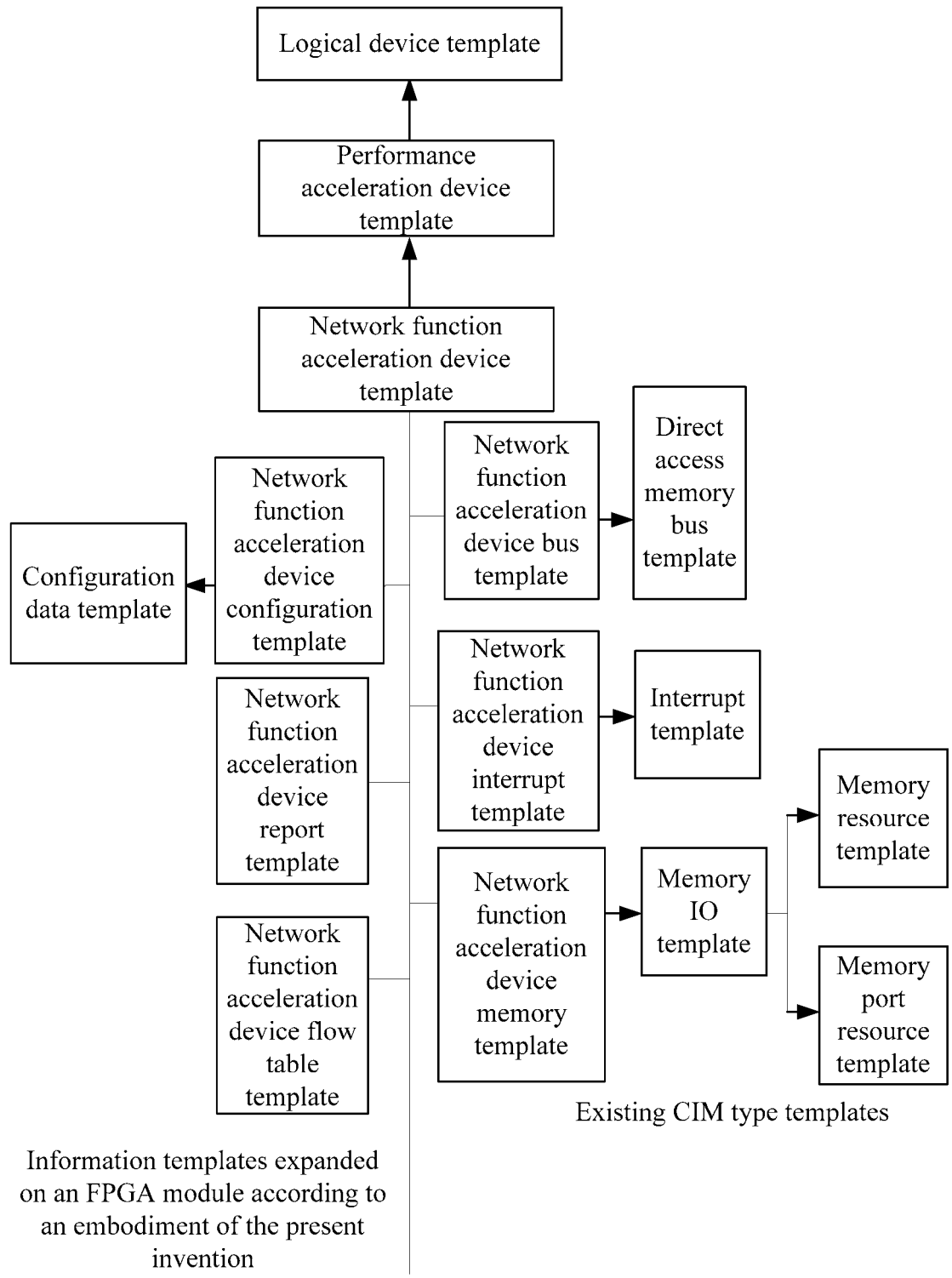
FIG. 2a is a form expression diagram of an information template according to an embodiment of the present invention.

In an embodiment of the present invention, by means of compatibility and expansion on an existing common information model (CIM), an information template of some fixed interfaces provided by the embodiment of the present invention is obtained, so as to provide a united and standardized template form expression for the NFAP. The information template obtained after expansion on the CIM and provided by the embodiment of the present invention is shown in FIG. 2a, where an existing CIM type template is on the right side, and an expansion on the right CIM type template of the embodiment of the present invention is on the left side. A configuration module in the embodiment of the present invention is a concrete expression of a network function acceleration device configuration template on the left side in FIG. 2a, and a data flow forwarding module is a concrete expression of a network function acceleration device flow table template. In addition, in the embodiment of the present invention, when an FPGA is powered on, an information report module may also be obtained in the FPGA according to the information template of the fixed interfaces and a network function acceleration device report template. Specifically, a framework file loaded by the FPGA when the FPGA is powered on specifically includes the configuration module generated according to the network function acceleration device configuration template and the data flow forwarding module generated according to the network function acceleration device flow table template. If the information report module is required, the framework file further includes the information report module generated according to the network function acceleration device report template, and after the FPGA is powered on and loads the FPGA framework file, the FPGA includes the configuration module, the data flow forwarding module, and the information report module.

It may be understood that, the information template of the fixed interfaces provided by FIG. 2a is merely a specific implementation manner provided by an embodiment of the present invention. Other compatibility and expansion may also be performed on the basis of the existing CIM type template according to specific needs, which is not limited herein.

Figure 2B:
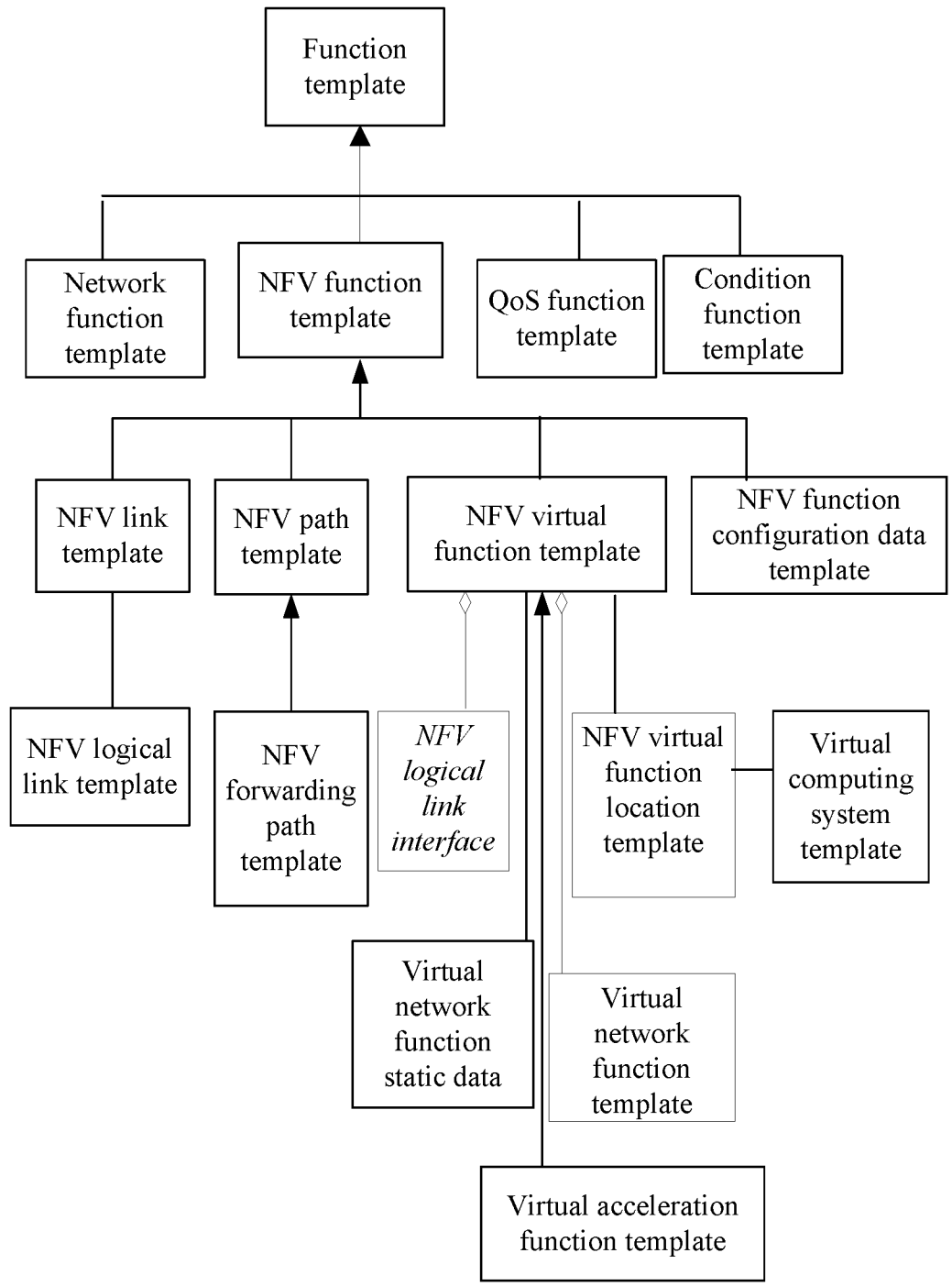
FIG. 2b is a form expression diagram of a configuration template according to an embodiment of the present invention.

Meanwhile, an embodiment of the present invention further provides a configuration template of a PR area on the basis of the CIM type template, specifically as shown in FIG. 2b. The configuration template may include a network function template, an NFV function template, a quality of service (QoS) function template, and a condition function template. In the embodiment of the present invention, an NFV service is deployed mainly by using a VM, and therefore, by inheriting from the NFV function template, the configuration template specifically further includes an NFV link template, an NFV path template, an NFV virtual function template, and an NFV function configuration data template. The NFV link template includes an NFV logical link template, the NFV path template specifically includes an NFV forwarding path template, and the NFV virtual function template includes an NFV virtual function location template, an NFV logical link interface, virtual network function static data, a virtual network function template, and a virtual acceleration function template, where the NFV virtual function location template further includes a virtual computing system template. It should be noted that, in FIG. 2b, a solid arrow expresses that upper and lower levels form an inheritance relationship, a straight line expresses that upper and lower levels form an association relationship, and a hollow rhombus expresses that upper and lower levels form an aggregation relationship. Expression manners of the inheritance relationship, the association relationship, and the aggregation relationship are common expression manners in the art.

Figure 3:
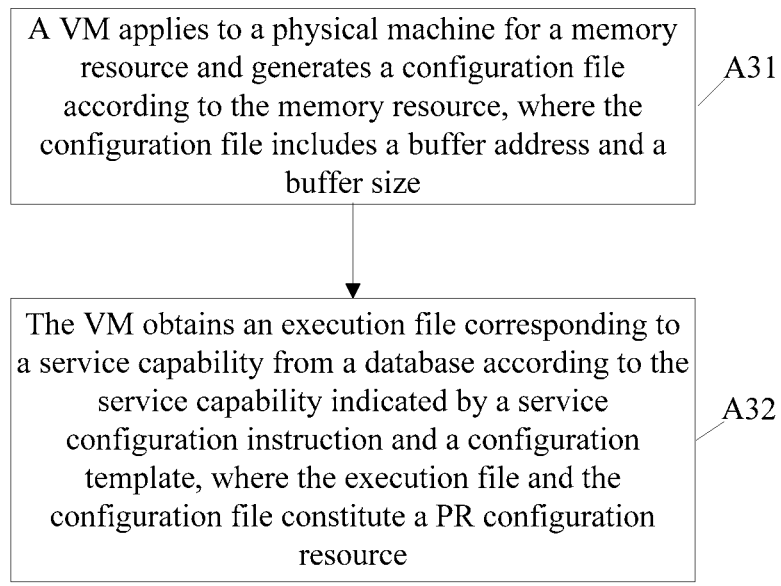
FIG. 3 is a schematic flowchart of a service deployment method according to another embodiment of the present invention.

According to the foregoing introduction, the foregoing step S103 that the VM generates the PR configuration resource according to the service configuration instruction and a configuration template mainly includes steps shown in FIG. 3.

A31. The VM applies to the physical machine for a memory resource and generates a configuration file according to the memory resource, where the configuration file includes a buffer address and a buffer size.

After the physical machine generates the VM, the VM has the correspondence with at least one of the M PR areas. The VM applies to the physical machine for the memory resource, which may be used when the VM interacts with the PR area. The memory resource may be the buffer address and the buffer size. A person skilled in the art may understand that the VM may also apply to the physical machine for other memory resources, and the buffer address and the buffer size are merely exemplified herein, but do not constitute a limitation to the memory resource in the present invention.

The VM and the PR area having the correspondence with the VM may read a buffer that is applied for.

A32. The VM obtains a PR execution file corresponding to a service capability from a database according to the configuration template and the service capability indicated by the service configuration instruction, where the PR execution file and the PR configuration file constitute the PR configuration resource.

The configuration template shown in FIG. 2b may be stored in the physical machine, and the VM may obtain the service processing capability of the PR area from the service configuration instruction and perform matching in the configuration module to obtain a specific function template, so as to obtain the corresponding execution file from the database according to a name of the function template.

It may be understood that, to reduce CPU consumption of the physical machine, the execution file may be stored in a database of a server, or in a database of another external device, which is not limited herein.

For example, if the PR area needs to be configured to have a DPI processing capability, that is, a concrete expression of the virtual acceleration function template shown in FIG. 2b, at first, the service capability obtained by the VM from the service configuration instruction is the DPI processing capability, that is, the PR area is configured as an area having the DPI processing capability. Then, a specific function template name, that is, virtual acceleration function template, is obtained, by matching, in the configuration template according to the DPI processing capability. And finally, the corresponding PR execution file is obtained from the database by using the virtual acceleration function template. The PR execution file and the PR configuration file constitute the PR configuration resource required for configuring the PR area.

The service resource configuration is performed in the PR area, so that the PR area has the service processing capability. And the forwarding entry is added in the forwarding flow table of the data flow forwarding module, so that the data flow forwarding module may forward the to-be-processed network packet to the PR area by searching for the forwarding entry in the forwarding flow table.

Figure 4A:
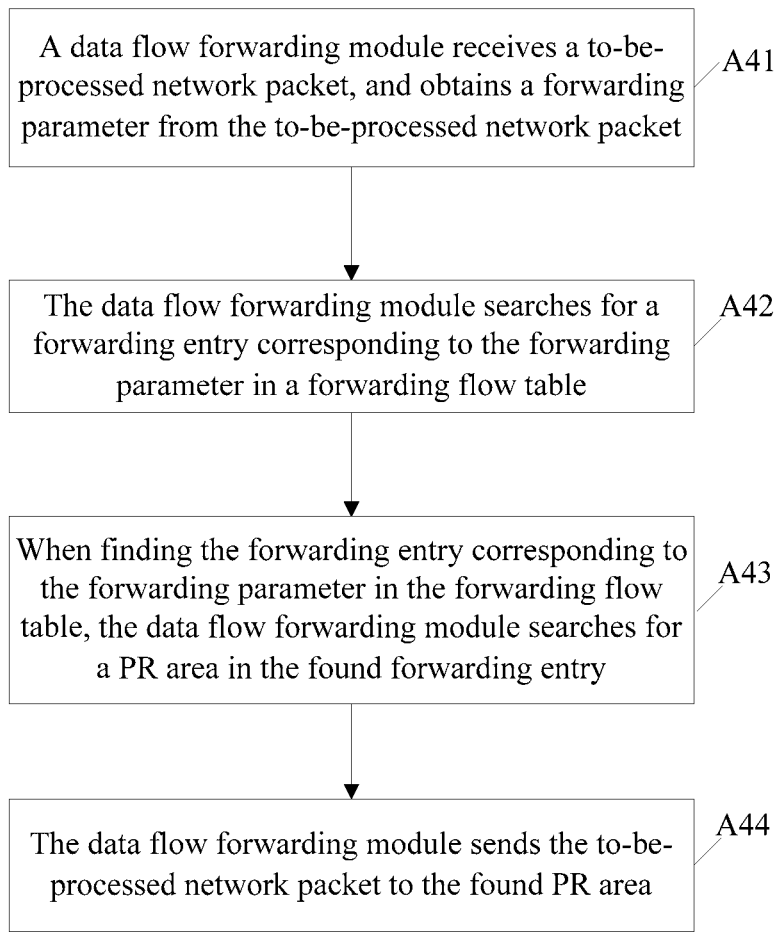
FIG. 4a is a schematic flowchart of a service deployment method according to another embodiment of the present invention.
Figure 4B:
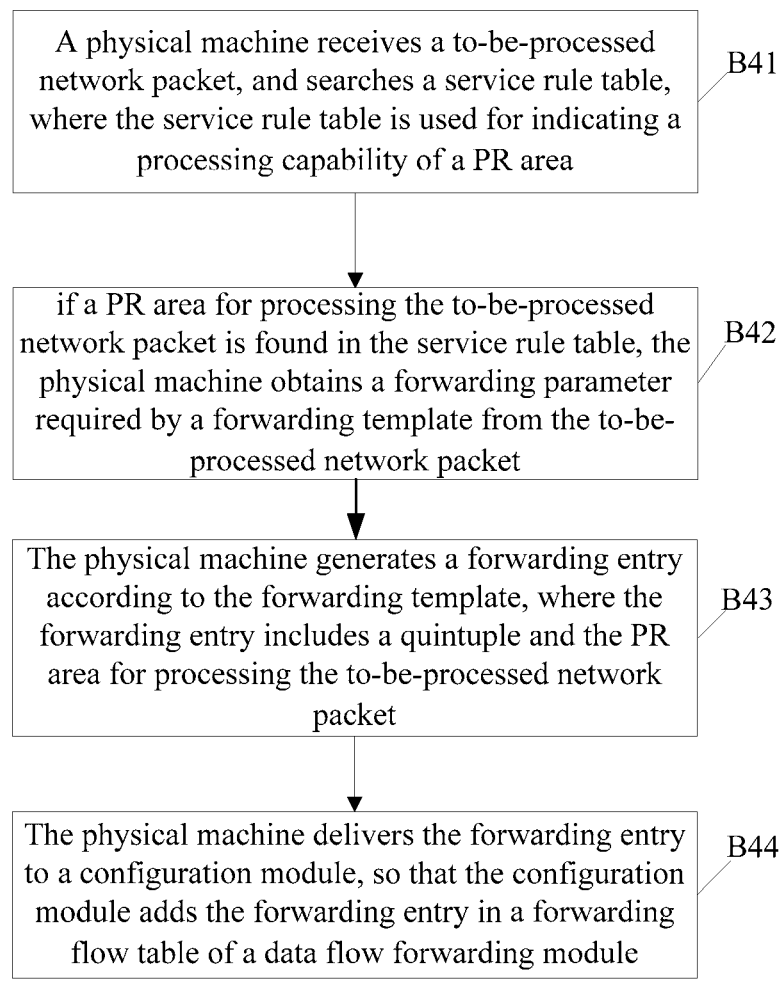
FIG. 4b is a schematic flowchart of a service deployment method according to another embodiment of the present invention.

Specifically, the forwarding, by the data flow forwarding module, a received network packet to the corresponding PR area by searching the forwarding flow table includes steps shown in FIG. 4a.

A41. The data flow forwarding module receives a to-be-processed network packet, and obtains a forwarding parameter from the to-be-processed network packet.

Preferably, the forwarding parameter provided by the embodiment of the present invention includes at least a quintuple in the to-be-processed network packet, where the quintuple includes a destination internet protocol Internet Protocol (IP) address, a source IP address, a destination port, a source port, and a transport layer protocol number.

A42. The data flow forwarding module searches for a forwarding entry corresponding to the forwarding parameter in the forwarding flow table.

The forwarding entry is a forwarding entry generated by the physical machine by obtaining the forwarding parameter from the to-be-processed network packet and performing generation according to the forwarding template, and a specific generation process is described in detail in a subsequent embodiment.

The forwarding flow table of the data flow forwarding module includes multiple forwarding entries, and one PR area may correspond to multiple forwarding entries. The forwarding entries are stored in the forwarding flow table by using hash addresses as indexes, so that speed of searching the forwarding flow table can be improved. Each forwarding entry includes at least a hash address, the quintuple, and the PR area.

Optionally, the forwarding entry may further include a next hop address, or the like.

It may be understood that, the hash address may be obtained, by calculating, by using the quintuple obtained from the to-be-processed network packet.

A43. When finding the forwarding entry corresponding to the forwarding parameter in the forwarding flow table, the data flow forwarding module searches for a PR area in the found forwarding entry.

A44. The data flow forwarding module sends the to-be-processed network packet to the found PR area.

If the forwarding entry is found in the forwarding flow table, the PR area is obtained from the forwarding entry, and then the to-be-processed network packet is forwarded to the PR area.

If no matching forwarding entry is found in the forwarding flow table (including a condition that the data flow forwarding module receives a to-be-processed network packet for the first time, and in this case, the forwarding flow table in the data flow forwarding module is empty), the data flow forwarding module sends the to-be-processed network packet to the physical machine, and the physical machine processes the to-be-processed network packet, which specifically includes:

B41. The physical machine receives the to-be-processed network packet, and searches a service rule table, where the service rule table is used for indicating processing capability of a PR area.

The service rule table is searched for determining whether a PR area having a service processing capability to process the to-be-processed network packet exists.

The service rule table mainly includes the configured PR area and the service processing capability of the PR area. Only when the PR area has the corresponding service processing capability, the to-be-processed network packet is forwarded to the PR area for processing.

The service rule table may be stored in the physical machine. After the configuration module configures the PR area, the VM notifies the physical machine of the PR area and the service processing capability of the PR area, and then the physical machine updates the service rule table. Certainly, the service rule table may also be generated in the VM, and after the VM obtains the service processing capability of the PR area from the service configuration instruction, the PR area and the service processing capability of the PR area are notified to the physical machine, and the physical machine updates the service rule table.

B42. If the PR area for processing the to-be-processed network packet is found in the service rule table, the physical machine obtains a forwarding parameter required by a forwarding template from the to-be-processed network packet.

If the PR area having the service processing capability to process the to-be-processed network packet is found, the forwarding parameter is obtained from the to-be-processed network packet, where the forwarding parameter includes the quintuple.

B43. The physical machine generates a forwarding entry according to the forwarding template, where the forwarding entry includes the quintuple and the PR area for processing the to-be-processed network packet.

B44. The physical machine delivers the forwarding entry to the configuration module, so that the configuration module adds the forwarding entry in the forwarding flow table of the data flow forwarding module.

An embodiment of the present invention further provides a forwarding template, where the forwarding template may be stored in the physical machine, and the physical machine obtains the forwarding parameter from the to-be-processed network packet. It may be understood that, the forwarding parameter refers to some required parameters indicated in the forwarding template, and then the forwarding entry is generated by using the forwarding parameter and according to the forwarding template.

For example, forwarding entries are stored in the forwarding template by using hash addresses as indexes. Each forwarding entry includes a quintuple, such as a source IP address, a source port, a destination IP address, a destination port, and a transport layer protocol number, and a hash address is obtained, by hash calculation, by using the quintuple. According to the forwarding template, the physical machine first obtains the quintuple from the to-be-processed network packet, and then obtains the hash address by calculation according to the quintuple, and finds the PR area having the corresponding processing capability according to the service rule table, so as to generate the forwarding entry.

The generated forwarding entry is sent to the configuration module, and the configuration module adds the forwarding entry in the forwarding flow table.

For example, the forwarding flow table in the data flow forwarding module may be shown in the following Table 1:

TABLE 1

| Hash address | Source IP address | Destination IP address | Source port | Destination port | Transport layer protocol number | PR area |
|---|---|---|---|---|---|---|
| 0 | 192.168.1.8 | 202.192.168.3 | 54078 | 53896 | 6 | PR1 |
| 1 | 192.168.1.8 | 202.192.168.15 | 54078 | 53896 | 6 | PR2 |

According to the forwarding flow table shown in Table 1, if the data flow forwarding module receives the to-be-processed network packet, obtains the quintuple, such as the source IP address 192.168.1.8, the destination IP address 202.192.168.15, the source port 54078, the destination port 53896, and the transport layer protocol number 6, from the network packet, and then obtains the hash address 1 by calculation according to the quintuple, and the area, to which the to-be-processed network packet needs to be forwarded, found in the forwarding flow table by using the hash address is the PR2 area, then the to-be-processed network packet is forwarded to the PR2 area.

It should be noted that, the forwarding flow table is related to a quantity of forwarding entries supported by a service. To reduce hash conflicts and shorten time for searching the forwarding flow table, storage space of the hash addresses may be at least 5 times a product of the quantity of forwarding entries and storage space of a single forwarding entry, and then the product of the quantity of forwarding entries and the storage space of a single forwarding entry is added to serve as a storage conflict forwarding entry, and the forwarding flow table may be updated and may also age.

Further, if the PR area having the capability to process the to-be-processed network packet is not found in the service rule table, the to-be-processed network packet is processed by a corresponding VM, and the generated forwarding entry includes the corresponding VM. Certainly, the forwarding entry may not need to be generated, and when the physical machine fails in finding the PR area in the service rule table, the physical machine directly forwards the to-be-processed network packet to the corresponding VM for processing.

According to the information template provided by FIG. 2a, the FPGA may further include an information report module. After performing service processing on the to-be-processed network packet, the PR area may send a processing result to the corresponding VM by using the information report module, or when processing the to-be-processed network packet, the PR area may report to the corresponding VM by using the information report module, so as to obtain a corresponding control policy.

The FPGA may further include a receiver. The receiver is configured to directly receive the to-be-processed network packet, and then send the to-be-processed network packet to the data flow forwarding module, and the data flow forwarding module searches the forwarding flow table and performs subsequent processing. Similarly, the FPGA further includes a sender. The sender is separately connected to the PR areas and forwards a processed network packet after the PR area performs the service processing on the to-be-processed network packet. Certainly, another module may also be added in the FPGA. The PR area first forwards the processed network packet to the another module, the another module forwards the processed network packet to the sender, and then the sender sends the processed network packet.

Figure 5:
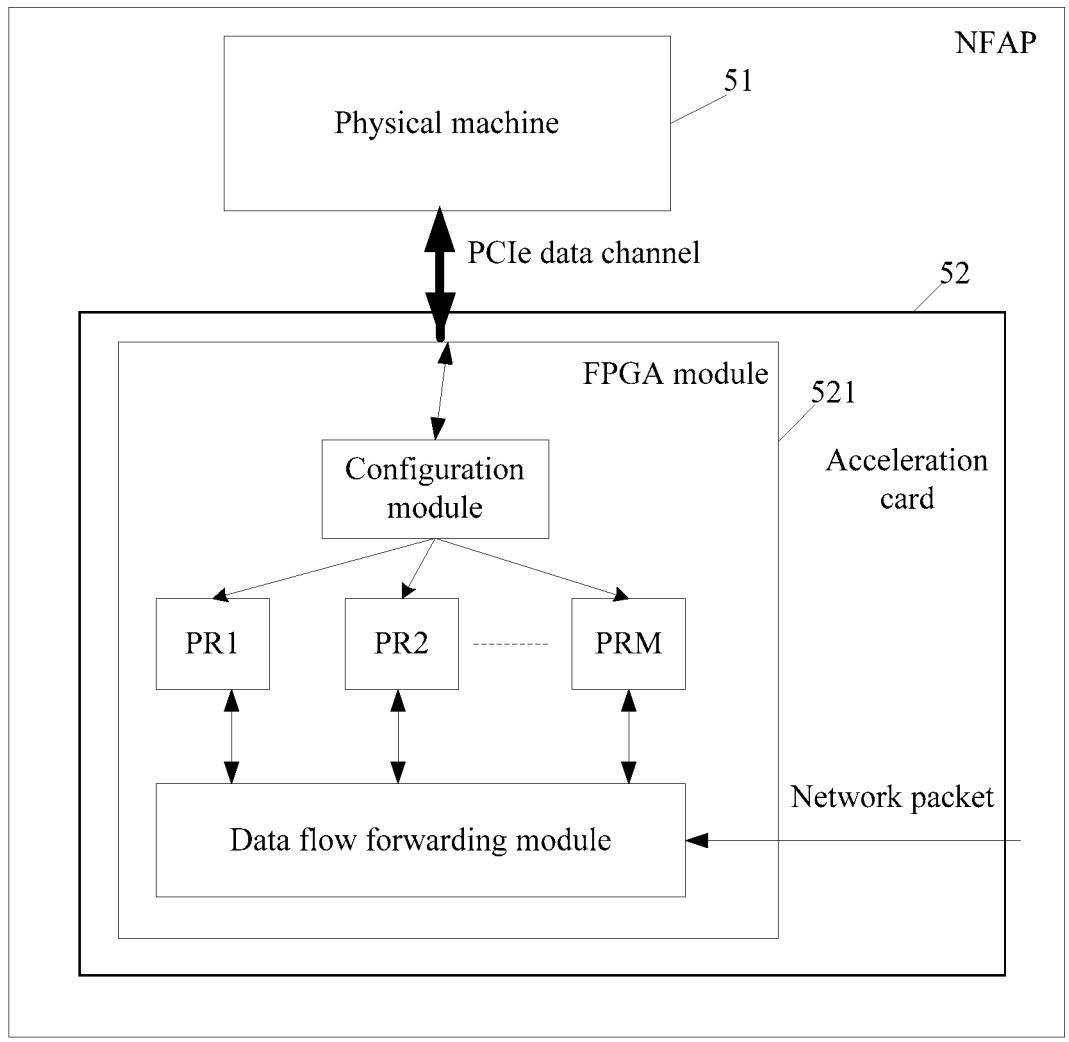
FIG. 5 is a schematic structural diagram of a network functions acceleration platform according to an embodiment of the present invention.

As shown in FIG. 5, an embodiment of the present invention further provides a network functions acceleration platform NFAP, including a physical machine 51 and an acceleration card 52, where the physical machine 51 is connected to the acceleration card 52 by using a PCIe data channel, and the acceleration card 52 includes a field-programmable gate array FPGA-521.

The FPGA-521 is configured to load an FPGA framework file when the FPGA is powered on, so that the FPGA includes M partial reconfigurable PR areas, a configuration module, and a data flow forwarding module, where a hardware resource in the FPGA is allocated to the PR areas, the configuration module is connected to the PCIe data channel and is connected to the PR areas, the data flow forwarding module is connected to the PR areas, the data flow forwarding module includes an empty forwarding flow table, and M is a positive integer greater than or equal to 1.

The physical machine 51 is configured to: when receiving a service configuration instruction, generate a virtual machine VM and select at least one PR area from the M PR areas to establish a correspondence with the VM.

The configuration module is configured to perform service resource configuration on the selected PR area according to a PR configuration resource, so that the selected PR area has a service processing capability, where the PR configuration resource is generated by the VM according to the service configuration instruction and a configuration template.

The configuration module is further configured to add a forwarding entry corresponding to the PR area in the forwarding flow table.

The data flow forwarding module is configured to forward a received network packet to the corresponding PR area by searching the forwarding flow table, where the forwarding entry is generated by the physical machine according to a to-be-processed network packet and a forwarding template.

When the FPGA is powered on for use, the FPGA first downloads the FPGA framework file from an acceleration card flash memory in which the FPGA is located, and then the FPGA loads the FPGA framework file, so that the FPGA includes the M partial reconfigurable (PR) areas, the configuration module, and the data flow forwarding module. The configuration module is connected to the PCIe data channel, and the data flow forwarding module and the PR areas are connected to obtain an NFAP.

The hardware resource in the FPGA, for example, a register, an internal storage, or a look up table (LUT) in the FPGA, is allocated to the PR areas, and certainly, an external storage or the like used by the FPGA may also be allocated to the PR areas.

It should be noted that, a same hardware resource is not allocated to two different PR areas for use, that is, different PR areas use their own hardware resources.

Preferably, the service configuration instruction includes a service configuration resource required for configuring the PR area, and a memory size, a hard disk size, a service capability, or the like of the to-be-generated VM. The service capability refers to a service processing capability of the PR area corresponding to the generated VM.

The memory size and the hard disk size of the generated VM satisfy the memory size and the hard disk size indicated in the service configuration instruction. A PR service configuration resource includes a PR configuration file required for configuring the PR area and a PR execution file required for performing service processing by the PR area, where the configuration file mainly includes a buffer address, a buffer size, and the like that may be used by the PR area, the PR execution file may be a program capable of implementing packet classification, state flow-based analysis, deep packet inspection (DPI), flow-based load balancing, and security processing and other processing, and contents in the configuration file are some memory resources that may be used when the execution file is executed.

In an implementation manner, the VM is configured to apply to the physical machine for a memory resource and generate a PR configuration file according to the memory resource, where the configuration file includes a buffer address and a buffer size; and obtain a PR execution file corresponding to a service capability from a database according to the configuration template and the service capability indicated by the service configuration instruction, where the PR execution file and the PR configuration file constitute the PR configuration resource.

In another implementation manner, the data flow forwarding module is specifically configured to receive a to-be-processed network packet, and obtain a forwarding parameter from the to-be-processed network packet, where the forwarding parameter includes a quintuple, and the quintuple includes a destination internet protocol IP address, a source IP address, a destination port, a source port, and a transport layer protocol number; search for a forwarding entry corresponding to the forwarding parameter in the forwarding flow table; when finding the forwarding entry corresponding to the forwarding parameter in the forwarding flow table, search for a PR area in the found forwarding entry; and send the to-be-processed network packet to the found PR area.

In an embodiment of the present invention, by means of compatibility and expansion on an existing common information model (CIM), an information template of some fixed interfaces provided by the embodiment of the present invention are obtained, so as to provide a united and standardized template form expression for the NFAP. The information template obtained after expansion on the CIM and provided by the embodiment of the present invention is shown in FIG. 2a, where an existing CIM type template is on the right side, and an expansion on the right CIM type template of the embodiment of the present invention is on the left side. A configuration module in the embodiment of the present invention is a concrete expression of a network function acceleration device configuration template on the left side in FIG. 2a, and a data flow forwarding module is a concrete expression of a network function acceleration device flow table template. In addition, in the embodiment of the present invention, when an FPGA is powered on, an information report module may also be obtained in the FPGA according to the information template of the fixed interfaces and a network function acceleration device report template. Specifically, a framework file loaded by the FPGA when the FPGA is powered on specifically includes the configuration module generated according to the network function acceleration device configuration template and the data flow forwarding module generated according to the network function acceleration device flow table template. If the information report module is required, the framework file further includes the information report module generated according to the network function acceleration device report template, and after the FPGA is powered on and loads the FPGA framework file, the FPGA includes the configuration module, the data flow forwarding module, and the information report module.

It may be understood that, the information template of the fixed interfaces provided by FIG. 2a is merely a specific implementation manner of the embodiment of the present invention. Other compatibility and expansion may also be performed on the basis of the existing CIM type template according to specific needs, which is not limited herein.

Meanwhile, an embodiment of the present invention further provides a configuration template of a PR area on the basis of the CIM type template, specifically as shown in FIG. 2b. The configuration template may include a network function template, an NFV function template, a quality of service (QoS) function template, and a condition function template. In the embodiment of the present invention, an NFV service is deployed mainly by using a VM, and therefore, by inheriting from the NFV function template, the configuration template specifically further includes an NFV link template, an NFV path template, an NFV virtual function template, and an NFV function configuration data template. The NFV link template includes an NFV logical link template, the NFV path template includes an NFV forwarding path template, and the NFV virtual function template includes an NFV virtual function location template, an NFV logical link interface, virtual network function static data, a virtual network function template, and a virtual acceleration function template. The NFV virtual function location template further includes a virtual computing system template. It should be noted that, in FIG. 2b, a solid arrow in FIG. 2b expresses that upper and lower levels form an inheritance relationship, a straight line expresses that upper and lower levels form an association relationship, and a hollow rhombus expresses that upper and lower levels form an aggregation relationship. Expression manners of the inheritance relationship, the association relationship, and the aggregation relationship are common expression manners in the art.

In another implementation manner, the data flow forwarding module is further configured to: when not finding the forwarding entry corresponding to the forwarding parameter in the forwarding flow table, send the to-be-processed network packet to the physical machine.

In another implementation manner, the physical machine is further configured to receive the to-be-processed network packet, and search a service rule table, where the service rule table is used for indicating processing capability of a PR area; if the PR area for processing the to-be-processed network packet is found in the service rule table, obtain a forwarding parameter required by a forwarding template from the to-be-processed network packet; generate a forwarding entry according to the forwarding template, where the forwarding entry includes a quintuple and the PR area for processing the to-be-processed network packet; and deliver the forwarding entry to the configuration module, so that the configuration module adds the forwarding entry in the forwarding flow table of the data flow forwarding module.

When an FPGA is powered on, the FPGA loads an FPGA framework file, so that the FPGA includes M partial reconfigurable PR areas, a configuration module, and a data flow forwarding module, where a hardware resource in the FPGA is allocated to the PR areas, the configuration module is connected to a PCIe data channel and is separately connected to the PR areas, and the data flow forwarding module is connected to the PR areas. When receiving a service configuration instruction, a physical machine generates a VM according to the service configuration instruction, a correspondence is established between the VM and at least one PR area, the configuration module performs service resource configuration on the selected PR area according to a PR configuration resource, and the configuration module further adds a forwarding entry corresponding to the PR area in a forwarding flow table, so that the data flow forwarding module forwards a received network packet to the corresponding PR area by searching the forwarding flow table. Compared with the prior art, in the embodiments of the present invention, the FPGA loads the FPGA framework file, so that the FPGA obtains the M partial reconfigurable PR areas, the configuration module, and the data flow forwarding module, and then the PR areas and the data flow forwarding module are configured by using the configuration module, so that the PR areas have a service processing capability, thereby reducing VM processing and improving processing efficiency and processing speed of an entire system.

In the foregoing embodiments, descriptions on the embodiments have different focuses, and for a part not described in detail in an embodiment, reference may be made to relevant descriptions in other embodiments.

A person skilled in the art may clearly understand that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a hardware form, or may also be implemented in a form of a software functional unit.

If the integrated unit is implemented in the form of the software functional unit and is sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personnel computer, a server, a network device, or the like) to execute all or some of the steps of the foregoing methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The service deployment method and the network functions acceleration platform provided by the embodiments of the present invention are introduced above in detail. A person of ordinary skill in the art may make variations on both the specific implementation manners and the application scope according to the thoughts of the embodiments of the present invention. In conclusion, content of this specification shall not be understood as a limitation to the present invention.

What is claimed is:

1. A service deployment method, wherein the service deployment method is applied to a network functions acceleration platform (NFAP), wherein the NFAP comprises a physical machine and an acceleration card, the physical machine and the acceleration card are connected by a PCIe data channel, and the acceleration card comprises a field-programmable gate array (FPGA), and the method comprises:

loading, by the FPGA, an FPGA framework file when the FPGA is powered on, so that the FPGA comprises M partial reconfigurable (PR) areas, a configuration module, and a data flow forwarding module, wherein a hardware resource in the FPGA is allocated to the PR areas, the configuration module is connected to the PCIe data channel and is connected to the PR areas, the data flow forwarding module is connected to the PR areas, the data flow forwarding module comprises an empty forwarding flow table, and M is a positive integer greater than or equal to 1;

when receiving a service configuration instruction, generating, by the physical machine, a virtual machine (VM), and selecting at least one PR area from the M PR areas to establish a correspondence with the VM;

performing, by the configuration module, service resource configuration on the selected at least one PR area according to a PR configuration resource, so that the selected at least one PR area has a service processing capability, wherein the PR configuration resource is generated by the VM according to the service configuration instruction and a configuration template; and adding, by the configuration module, a forwarding entry corresponding to the PR area in the forwarding flow table, so that the data flow forwarding module forwards a received network packet to the corresponding PR area by searching the forwarding flow table, wherein the forwarding entry is generated by the physical machine according to a to-be-processed network packet and a forwarding template.

2. The method according to claim 1, wherein the generating, by the VM, the PR configuration resource according to the service configuration instruction and a configuration template comprises:

applying, by the VM, to the physical machine for a memory resource and generating a PR configuration file according to the memory resource, wherein the PR configuration file comprises a buffer address and a buffer size; and obtaining, by the VM, a PR execution file corresponding to a service capability from a database according to the configuration template and the service capability indicated by the service configuration instruction, wherein the PR execution file and the PR configuration file comprise the PR configuration resource.

3. The method according to claim 1, wherein the forwarding, by the data flow forwarding module, a received network packet to the corresponding PR area by searching the forwarding flow table comprises:

receiving, by the data flow forwarding module, the to-be-processed network packet, and obtaining a forwarding parameter from the to-be-processed network packet, wherein the forwarding parameter comprises a quintuple, and the quintuple comprises a destination internet protocol (IP) address, a source IP address, a destination port, a source port, and a transport layer protocol number;

searching, by the data flow forwarding module, for a forwarding entry corresponding to the forwarding parameter in the forwarding flow table;

when finding the forwarding entry corresponding to the forwarding parameter in the forwarding flow table, searching, by the data flow forwarding module, for a PR area in the found forwarding entry; and sending, by the data flow forwarding module, the to-be-processed network packet to the found PR area.

4. The method according to claim 3, wherein the method further comprises:

when not finding a forwarding entry corresponding to the forwarding parameter in the forwarding flow table, sending, by the data flow forwarding module, the to-be-processed network packet to the physical machine.

5. The method according to claim 4, wherein after the sending, by the data flow forwarding module, the to-be-processed network packet to the physical machine, the method further comprises:

receiving, by the physical machine, the to-be-processed network packet, and searching a service rule table, wherein the service rule table is used for indicating processing capability of a PR area;

obtaining, by the physical machine, a forwarding parameter required by the forwarding template from the to-be-processed network packet when the PR area for processing the to-be-processed network packet is found in the service rule table;

generating, by the physical machine, a forwarding entry according to the forwarding template, wherein the forwarding entry comprises a quintuple of the to-be-processed network packet and the PR area for processing the to-be-processed network packet; and delivering, by the physical machine, the forwarding entry to the configuration module, so that the configuration module adds the forwarding entry in the forwarding flow table of the data flow forwarding module.

6. network functions acceleration platform, wherein the network functions acceleration platform comprises a physical machine and an acceleration card, the physical machine and the acceleration card are connected by using a PCIe data channel, and the acceleration card comprises a field-programmable gate array (FPGA);

the FPGA is configured to load an FPGA framework file when the FPGA is powered on, so that the FPGA comprises M partial reconfigurable (PR) areas, a configuration module, and a data flow forwarding module, wherein a hardware resource in the FPGA is allocated to the PR areas, the configuration module is connected to the PCIe data channel and is connected to the PR areas, the data flow forwarding module is connected to the PR areas, the data flow forwarding module comprises an empty forwarding flow table, and M is a positive integer greater than or equal to 1;

the physical machine is configured to: when receiving a service configuration instruction, generate a virtual machine (VM) and select at least one PR area from the M PR areas to establish a correspondence with the VM;

the configuration module is configured to perform service resource configuration on the selected at least one PR area according to a PR configuration resource, so that the selected at least one PR area has a service processing capability, wherein the PR configuration resource is generated by the VM according to the service configuration instruction and a configuration template;

the configuration module is further configured to add a forwarding entry corresponding to the PR area in the forwarding flow table; and the data flow forwarding module is configured to forward a received network packet to the corresponding PR area by searching the forwarding flow table, wherein the forwarding entry is generated by the physical machine according to a to-be-processed network packet and a forwarding template.

7. The network functions acceleration platform according to claim 6, wherein:

the VM is configured to apply to the physical machine for a memory resource and generate a PR configuration file according to the memory resource, wherein the PR configuration file comprises a buffer address and a buffer size; and obtain a PR execution file corresponding to a service capability from a database according to the configuration template and the service capability indicated by the service configuration instruction, wherein the PR execution file and the PR configuration file comprise the PR configuration resource.

8. The network functions acceleration platform according to claim 6, wherein:

the data flow forwarding module is configured to receive the to-be-processed network packet, and obtain a forwarding parameter from the to-be-processed network packet, wherein the forwarding parameter comprises a quintuple, and the quintuple comprises a destination internet protocol (IP) address, a source IP address, a destination port, a source port, and a transport layer protocol number; search for a forwarding entry corresponding to the forwarding parameter in the forwarding flow table; when the forwarding entry corresponding to the forwarding parameter in the forwarding flow table is found, search for a PR area in the found forwarding entry; and send the to-be-processed network packet to the found PR area.

9. The network functions acceleration platform according to claim 8, wherein:

the data flow forwarding module is further configured to: when the forwarding entry corresponding to the forwarding parameter in the forwarding flow table is not found, send the to-be-processed network packet to the physical machine.

10. The network functions acceleration platform according to claim 8, wherein:

the physical machine is further configured to receive the to-be-processed network packet, and search a service rule table, wherein the service rule table is used for indicating processing capability of a PR area; when the PR area for processing the to-be-processed network packet is found in the service rule table, obtain a forwarding parameter required by the forwarding template from the to-be-processed network packet; generate a forwarding entry according to the forwarding template, wherein the forwarding entry comprises a quintuple of the to-be-processed network packet and the PR area for processing the to-be-processed network packet; and deliver the forwarding entry to the configuration module, so that the configuration module adds the forwarding entry in the forwarding flow table of the data flow forwarding module.

* * * * *